(12) United States Patent
Takashima et al.

(10) Patent No.: US 8,174,495 B2
(45) Date of Patent: May 8, 2012

(54) ELECTRONIC APPARATUS

(75) Inventors: Kouichiro Takashima, Tokyo (JP); Jun Uchida, Saitama (JP); Yoshikazu Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1093 days.

(21) Appl. No.: 11/553,218

(22) Filed: Oct. 26, 2006

(65) Prior Publication Data

US 2007/0097073 A1    May 3, 2007

(30) Foreign Application Priority Data

Oct. 28, 2005 (JP) ................. 2005-315079

(51) Int. Cl.
*G09G 5/10* (2006.01)
(52) U.S. Cl. ............ 345/156; 345/177; 178/18.04
(58) Field of Classification Search ............ 345/156, 345/161, 20, 157, 163, 184, 177; 707/102; 709/203; 178/18.04
See application file for complete search history.

(56) References Cited

U.S. PATENT DOCUMENTS

| | | | |
|---|---|---|---|
| 6,429,846 B2 * | 8/2002 | Rosenberg et al. | 345/156 |
| 2002/0140783 A1 * | 10/2002 | Takahashi | 347/72 |
| 2003/0231170 A1 * | 12/2003 | Yoshikawa et al. | 345/173 |
| 2004/0164954 A1 | 8/2004 | Rekimoto | |

FOREIGN PATENT DOCUMENTS

| | | | |
|---|---|---|---|
| JP | 2002-149312 | | 5/2002 |
| JP | 2004-021697 | | 1/2004 |
| JP | 2004-094389 | * | 3/2004 |
| JP | 2004-252836 | | 9/2004 |
| JP | 2005-077674 | | 3/2005 |
| JP | 2005-085201 | | 3/2005 |
| JP | 2005-267058 | | 9/2005 |

OTHER PUBLICATIONS

Japanese Office Action issued on Jun. 1, 2010 for corresponding Japanese patent application 2005-315079.
Japanese Office Action dated Jun. 14, 2011, for corresponding Japanese Patent Appln. No. 2005-315079.
Japanese Office Action issued on Feb. 24, 2009, for corresponding Japanese Patent Application JP 2005-315079.

* cited by examiner

*Primary Examiner* — Lun-Yi Lao
*Assistant Examiner* — Shaheda Abdin
(74) *Attorney, Agent, or Firm* — K&L Gates LLP

(57) ABSTRACT

An electronic apparatus is provided. The electronic apparatus includes a contact detection section for detecting contact from a user, a vibration output section for outputting an acoustic vibration that can be sensed by the user as a sound and a haptic vibration for stimulating the haptic sense of the user, a pattern generation section for generating an output vibration pattern including the acoustic vibration and the haptic vibration in response to the contact detection section detecting the contact from the user, and a drive section for driving the vibration output section in accordance with the output vibration pattern to make the vibration output section output the acoustic vibration and the haptic vibration.

9 Claims, 12 Drawing Sheets

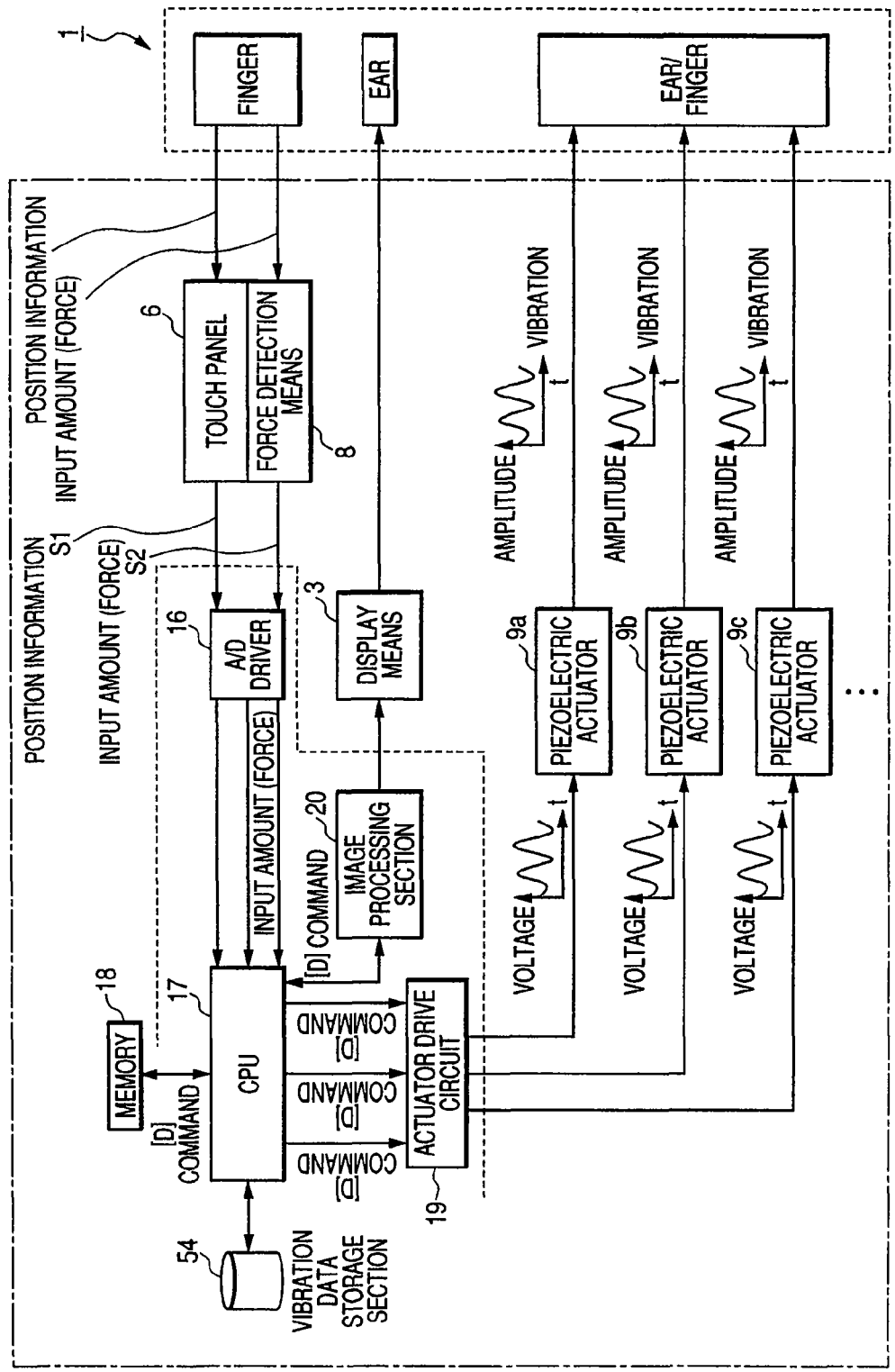

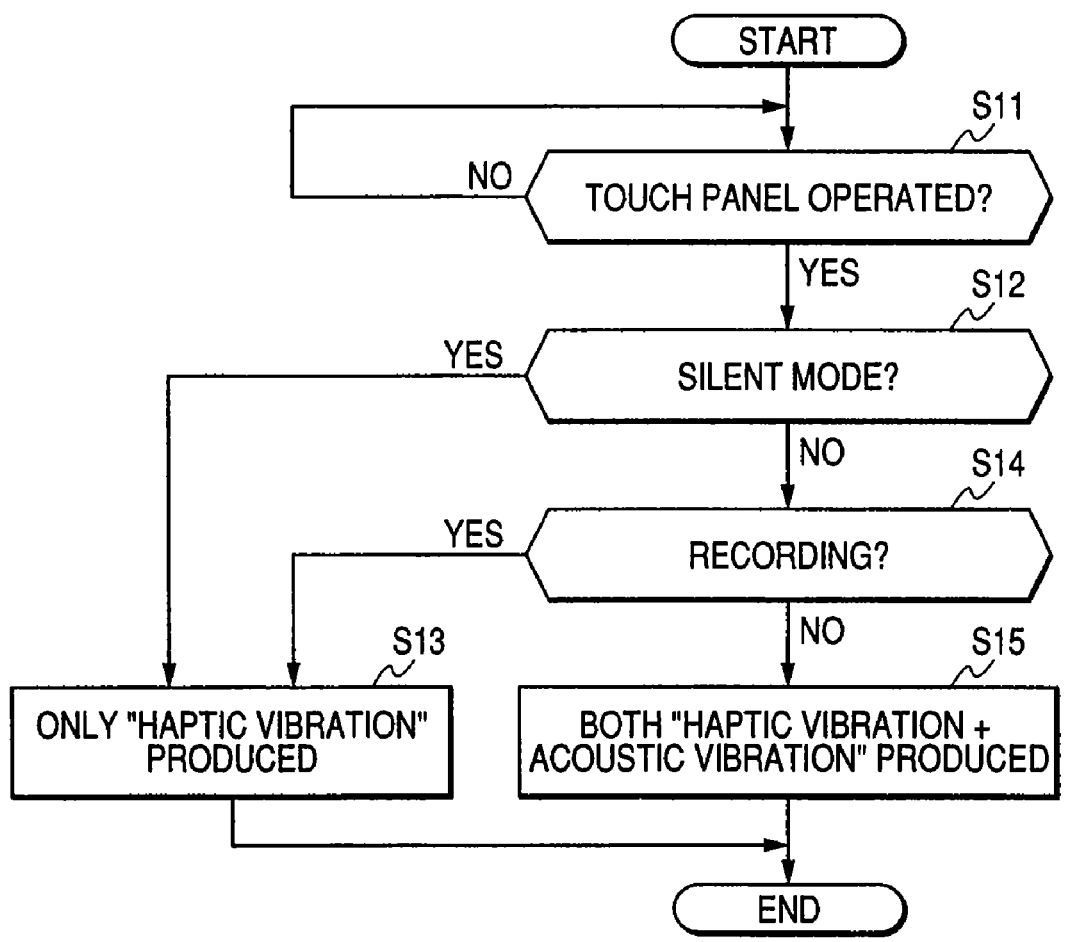

ELECTRONIC APPARATUS

CROSS REFERENCES TO RELATED APPLICATIONS

The present application claims priority to Japanese Patent Application JP 2005-315079 filed in the Japanese Patent Office on Oct. 28, 2005, the entire contents of which being incorporated herein by reference.

BACKGROUND

The present disclosure relates to an electronic apparatus provided with a haptic vibration generation function for vibrating a contact portion with the user.

As an input device for inputting data to an electronic apparatus, there can be a keyboard, a jog dial, a mouse, a scanner, a voice recognition device, and so on. The keyboard is equipped with a number of keys, and is capable of inputting alphabets or symbols respectively corresponding to the keys. The jog dial is capable of inputting an amount of rotation of its rotator. In building the keyboard or the jog dial in the electronic apparatus, design limitations regarding the size and the weight thereof problematically occur.

In the past, in order for simplify the machine design of such an input device, there has been developed an input device having a contact detection sensor provided to the jog dial for temporarily vibrating an area around a contact position in accordance with variation of the contact position or the contact area thereof to provide the user with the same operation feeling as the operation feeling of the jog dial, thereby reducing the overall size and the weight of the apparatus (see, for example, JP-A-2004-252836).

Further, a touch panel is an input device integrated with a display screen. Since the user directly touches the input object in the touch panel, the touch panel can offer natural operationality. Further, the layout of the touch panel can freely be modified with software control. The touch panel dose not offer a haptic operation, and accordingly causes the user to have a barren impression. Consequently, in recent years, there has been developed an input device provided with realistic operationality by vibrating the touch panel to reproduce a haptic vibration corresponding to friction in holding down or sliding a button.

FIG. 12 is a block diagram showing an internal structure of a cellular phone 100 provided with a haptic reproduction function. The cellular phone 100 is provided with an antenna 101 for transmitting and receiving radio waves, a shared terminal 102 for amplifying the radio waves, a receiving section 103 for demodulating the radio waves received by the antenna 101, a transmission section 105 for modulating the signal output from a central processing unit (CPU) 104 to output it to the antenna 101, a memory 106 as a working area of the CPU 104, a display section 107 for displaying images, an image processing section 108 for generating images to be displayed on the display section 107, a microphone 109 for inputting spoken voice of the user, and a loudspeaker 110 for outputting ring alert or spoken voice. Further, for realizing the function of providing the haptic vibration, the cellular phone 100 is provided with an input detection section 111 for detecting an input position and an input amount (force), an A/D driver 112 for amplifying an output of the input detection section 111, piezoelectric actuators 113A through 113C for generating haptic vibration, and an actuator driver 114 for driving the piezoelectric actuators 113A through 113C.

The cellular phone 100 outputs a vibration pattern to the piezoelectric actuators 113A through 113C based on the input position information and the input amount detected by the input detection section 111 to vibrate the piezoelectric actuators 113A through 113C, thereby causing haptic vibration corresponding to input haptic impression of an actual switch.

In general, the cellular phone is provided with the microphone 109, the loudspeaker 110, the display section 107, and so on. In the cellular phone 100 shown in FIG. 12, there are additionally required the actuator drive circuit 114 and a plurality of piezoelectric actuators 113A through 113C to generate haptic vibration. It does not apply only to cellular phones that an additional function causes increase in the number of components, resulting in design limitations in the size and the weight.

Therefore, it is desirable to simplify the structure of the electronic apparatus provided with a haptic vibration generation function.

SUMMARY

According to an embodiment, there is provided an electronic apparatus including a contact detection section for detecting contact from a user, a vibration output section for outputting an acoustic vibration that can be sensed by the user as an acoustic and a haptic vibration stimulating haptic sense of the user, a pattern generation section for generating an output vibration pattern including the acoustic vibration and the haptic vibration in response to the contact detection section detecting the contact from the user, and a drive section for driving the vibration output section in accordance with the output vibration pattern to make the vibration output section output the acoustic vibration and the haptic vibration.

The electronic apparatus according to an embodiment outputs the two kinds of vibrations, namely the acoustic vibration that can be sensed by the user as an acoustic and the haptic vibration stimulating the haptic sense of the user, from a single vibration output section, thus simplifying the structure thereof. Further, the electronic apparatus according to the embodiment generates the output vibration pattern of the acoustic vibration and the haptic vibration by a single pattern generation section, and the acoustic vibration and haptic vibration are generated by driving the vibration output section with a single drive section, thus simplifying the structure thereof.

Additional features and advantages are described herein, and will be apparent from, the following Detailed Description and the figures.

BRIEF DESCRIPTION OF THE FIGURES

FIG. 7 is a block diagram showing an internal configuration of an electronic apparatus according to an embodiment.

FIG. 10 is a flowchart for explaining a procedure of a silent mode process.

DETAILED DESCRIPTION

An electronic apparatus 50 according to an embodiment will hereinafter be explained with reference to FIG. 1. The electronic apparatus 50 according to the embodiment is provided with a touch panel 51 as a contact-type input interface for performing input by directly touching the tip of the user's finger or a specialized pen thereto. The electronic apparatus 50 is provided with a piezoelectric actuator 53 as a vibration output section. The piezoelectric actuator 53 outputs a haptic vibration for stimulating the user's haptic sense and an acoustic vibration, which the user can sense as a sound.

Figure 1:
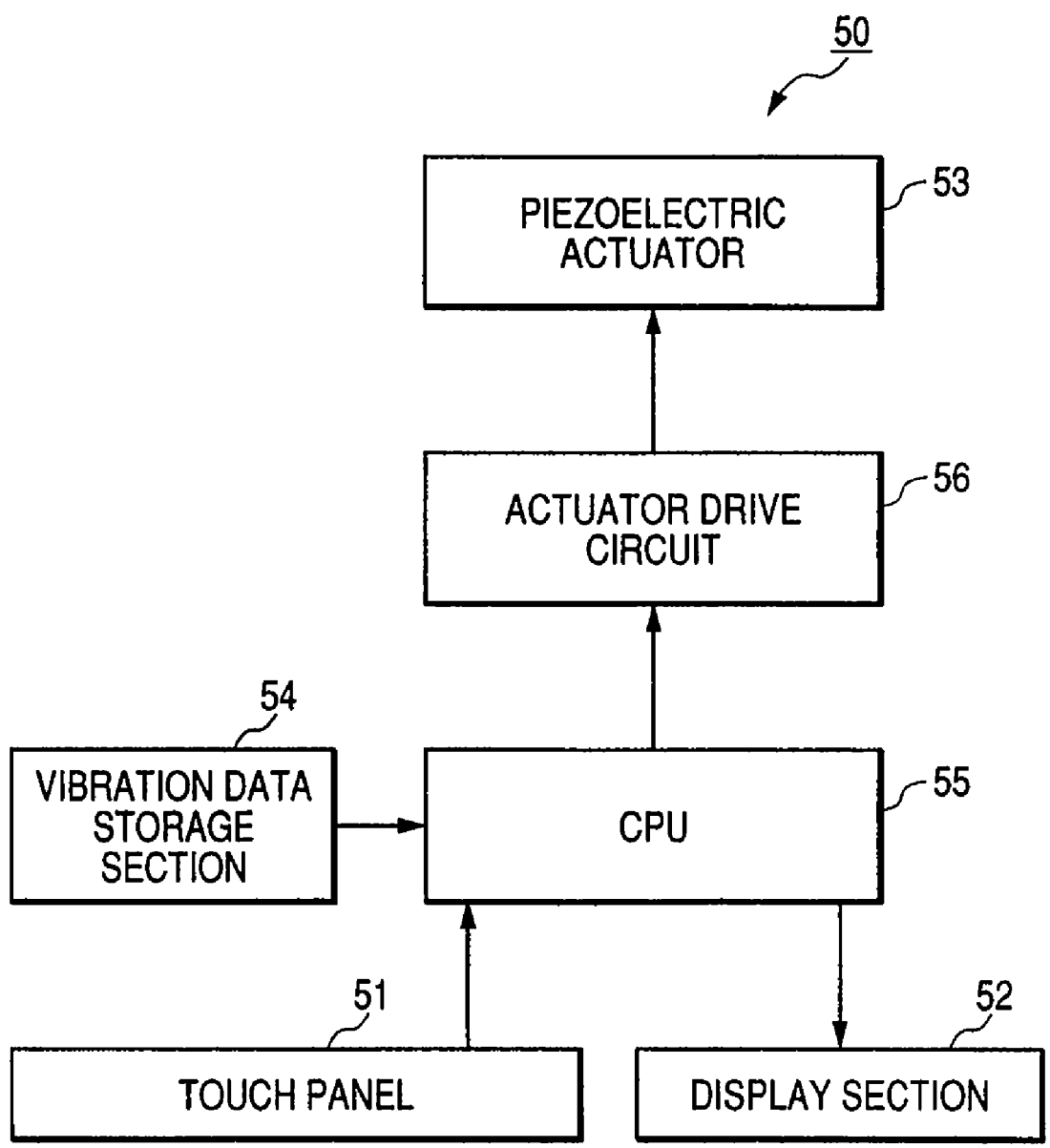
FIG. 1 is a block diagram showing an internal configuration of an electronic apparatus according to an embodiment.

FIG. 1 is a block diagram showing an internal configuration of the electronic apparatus 50. As shown in FIG. 1, the electronic apparatus 50 is provided with a touch panel 51 for detecting contact by the user, a display section 52 for displaying a display screen, a piezoelectric actuator 53 for generating the acoustic vibration and the haptic vibration, a vibration data storage section 54 for storing the vibration pattern, a CPU 55 which generates an output vibration pattern for driving the piezoelectric actuator 53, and an actuator drive circuit 56 for driving the piezoelectric actuator 53 in accordance with the output vibration pattern.

The touch panel 51 is disposed overlapping the display section 52. The touch panel 51 has translucency, and the display screen of the display section 52 can be seen through the touch panel 51. On the display screen, there are displayed objects such as a command button or a slide bar. When the user touches the panel 51, information of the contact position is output to the CPU 55.

The CPU 55 specifies which one of the objects the user has touched based on the position information input from the touch panel 51. The CPU 55 selects the vibration pattern stored in the vibration data storage section 54 in accordance with the object touched by the user, and generates the output vibration pattern based on the selected vibration pattern. The output vibration pattern is a single vibration pattern or a combination of a plurality of vibration patterns.

The vibration pattern is expressed by the frequency, the amplitude, and the number of the vibration. The CPU 55, when combining the plurality of vibration patterns, combines each of the vibration patterns in a time-sharing manner. Thus, it can be prevented that the vibration patterns interfere with each other to cause noises. Further, when combining the vibration pattern of the acoustic vibration with the vibration pattern of the haptic vibration, the CPU 55 combines them so that the vibration pattern of the haptic vibration is output earlier than the vibration pattern of the acoustic vibration. When the haptic vibration is generated earlier, no time lag is generated between the moment of touching the touch panel 51 and the moment of responding with the haptic vibration, thus preventing the user from feeling uncomfortable.

The actuator drive circuit 56 inputs the output vibration pattern from the CPU 55. The output vibration pattern is expressed by the frequency, the amplitude, and the number of the vibration. The actuator drive circuit 56 converts the output vibration pattern into a voltage waveform applied to the piezoelectric actuator 53.

Figure 2:
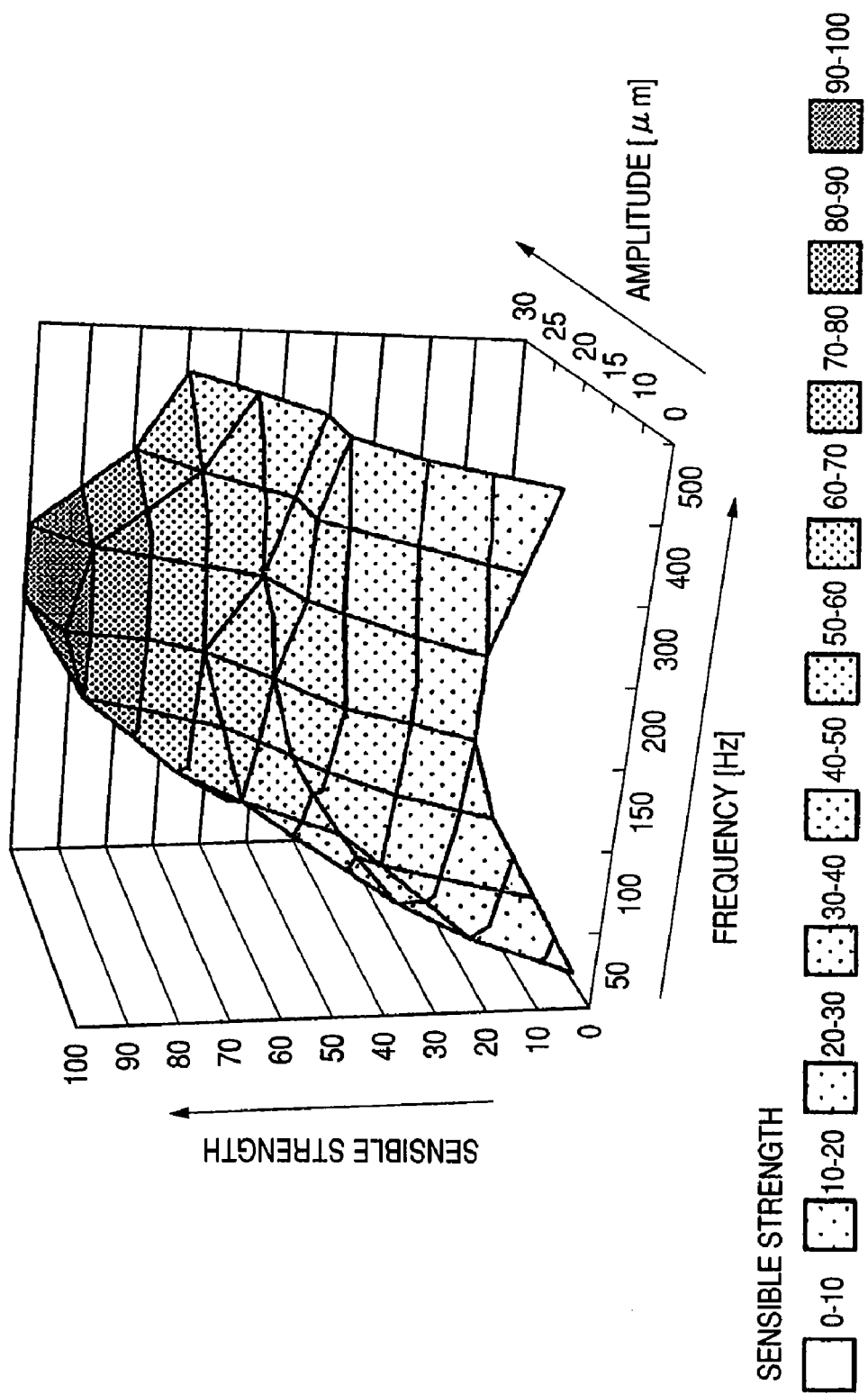
FIG. 2 is a graph chart for explaining frequency bands of haptic vibrations.

The frequency band of the haptic vibration is around 50 Hz through 500 Hz. This frequency band has been obtained by an experiment. In the present experiment, the voltage waveforms with different frequencies and amplitudes are applied to the piezoelectric actuator 53 in the condition in which the examinee attaches the finger to the piezoelectric actuator 53. FIG. 2 is a chart graphing the number of examinees who sense the vibration while changing the frequency [Hz] and the amplitude [μm]. According to the graph, it appears that the number of the examinees who sense the vibration is distributed in the range of 50 Hz through 500 Hz, and has a peak around the frequency of 200 Hz. Further, according to FIG. 2, it appears that the sensitivity of the vibration can be enhanced by increasing the amplitude [μm].

On the other hand, the frequency band of the acoustic vibration is higher than 500 Hz. Since there is a distance between the frequency band of the acoustic vibration and the frequency band of the haptic vibration, human beings do not feel the acoustic vibration as a vibration, and adversely, do not hear the haptic vibration as a sound.

The electronic apparatus 50 outputs both of the haptic vibration and the acoustic vibration with the piezoelectric actuator 53, utilizing the difference in the frequency between the haptic vibration and the acoustic vibration. Thus, the members necessary for outputting sound such as a loudspeaker or a buzzer can be eliminated.

Figure 3:
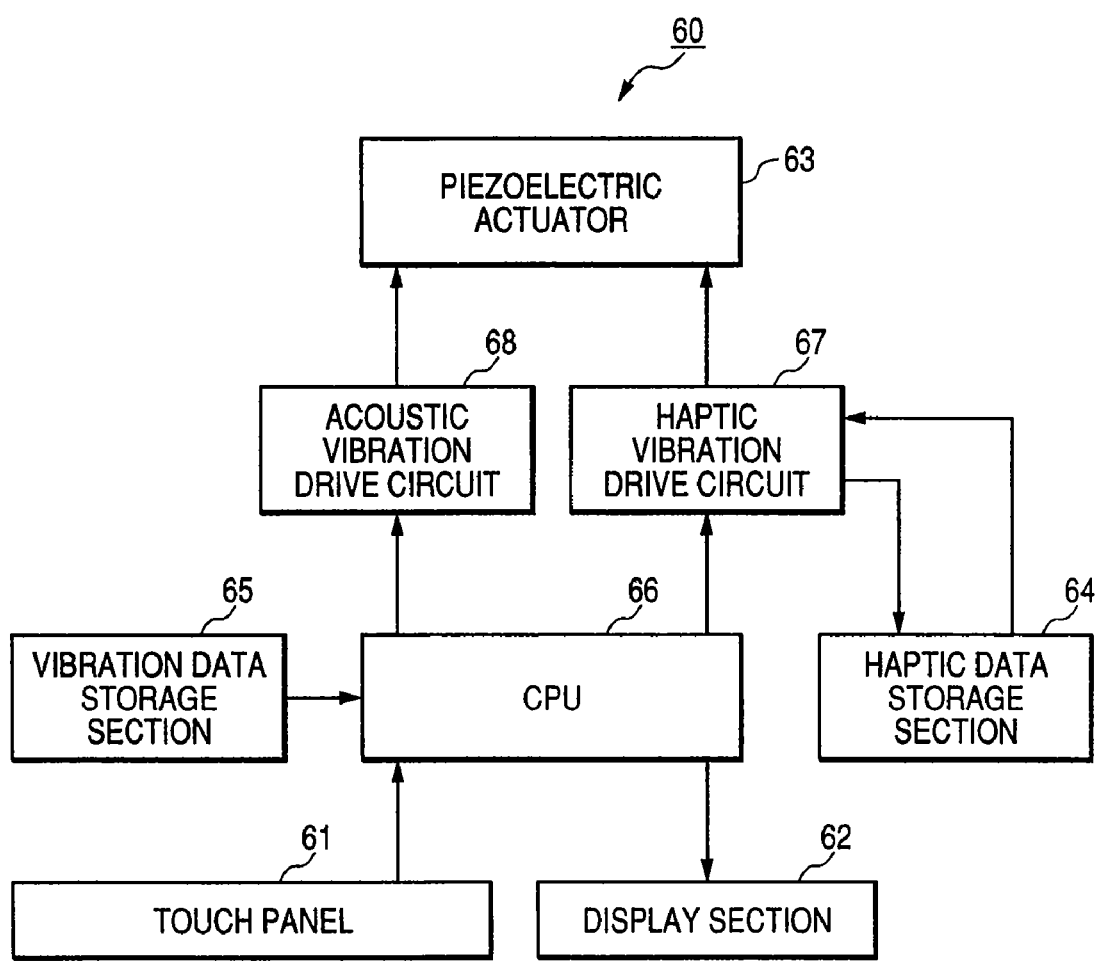
FIG. 3 is a block diagram showing an internal configuration of an electronic apparatus before according to an embodiment.

Further, the electronic apparatus 50 according to an embodiment is characterized by integrating the circuits for driving the piezoelectric actuators into a single circuit of the actuator drive circuit 56. The configuration of an electronic apparatus 60, in which the embodiment has not yet been applied, is shown for the sake of comparison. The electronic apparatus 60 shown in FIG. 3 is provided with a touch panel 61 for detecting contact by the user, a display section 62 for displaying an image viewed through the touch panel 61, a piezoelectric actuator 63 for outputting the haptic vibration and the acoustic vibration, a haptic data storage section 64 for storing the vibration pattern of the haptic vibration, an acoustic data storage section 65 for storing the vibration pattern of the acoustic vibration, a CPU 66 for selecting the vibration pattern, a haptic vibration drive circuit 67 for controlling the voltage applied to the piezoelectric actuator 63 in accordance with the vibration pattern of the haptic vibration, and an acoustic vibration drive circuit 68 for controlling the voltage applied to the piezoelectric actuator 63 in accordance with the vibration pattern of the acoustic vibration.

The configurations of the touch panel 61, the display section 62, and the piezoelectric actuator 63 are substantially the same as those of the touch panel 51, the display section 52, and the piezoelectric actuator 53 of the electronic apparatus 50 shown in FIG. 1, respectively, and the descriptions therefor are accordingly omitted here.

The haptic data storage 64 stores the vibration patterns of the haptic vibration. Each of the vibration patterns in the haptic data storage section 64 is provided with an identifier. The CPU 66 selects an appropriate one of the vibration patterns of the haptic vibration and outputs the identifier of the vibration pattern to the haptic vibration drive circuit 67. The haptic vibration drive circuit 67 retrieves the selected vibration pattern from the haptic data storage section 64 based on the identifier input from the CPU 66.

The haptic vibration drive circuit 67 converts the waveform of the voltage applied to the piezoelectric actuator 63 in accordance with the frequency, the amplitude, and the vibration number of the vibration pattern.

On the other hand, the acoustic data storage section 65 stores the vibration patterns of the acoustic vibration. The CPU 66 selects an appropriate one of the vibration patterns of the acoustic vibration and outputs the selected vibration pattern of the acoustic vibration to the acoustic vibration drive circuit 68.

The haptic vibration drive circuit 68 converts the waveform of the voltage applied to the piezoelectric actuator 63 in accordance with the frequency, the vibration amplitude, and the vibration number of the vibration pattern input from the CPU 66.

Since the electronic apparatus 60 before applying the embodiment drives the piezoelectric actuator 63 with the two circuits, namely the haptic vibration drive circuit 67 and the acoustic vibration drive circuit 68, the number of components increases and the structure of the system becomes complicated.

Further, since in the electronic apparatus 60, the haptic vibration drive circuit 67 and the acoustic vibration drive circuit 68 drive the actuator independently from each other, the vibration pattern of the haptic vibration and the vibration pattern of the acoustic vibration might interfere with each other to cause noise. Still further, when the acoustic vibration is output in advance of the haptic vibration, the time lag between the moment of touching the touch panel 61 and the moment of responding with the haptic vibration makes the user feel uncomfortable.

In the electronic apparatus 50 according to the embodiment, two blocks of the acoustic data storage section 65 and the haptic data storage section 64 are integrated into a single block of the vibration data storage section 54, and two blocks of the acoustic vibration drive circuit 68 and the haptic vibration drive circuit 67 are also integrated into a single block of the actuator drive circuit 56, thereby simplifying the structure of the electronic apparatus 50.

Further, since in the electronic apparatus 50 according to the embodiment, in combining the plurality of vibration patterns, each of the vibration patterns is combined in a time-sharing manner, the noises caused by the interference between the vibration patterns are not generated.

Still further, since in the electronic apparatus 50 according to the embodiment, when combining the vibration pattern of the acoustic vibration and the vibration pattern of the haptic vibration, the combination is performed so that the vibration pattern of the haptic vibration is output earlier than the vibration pattern of the acoustic vibration, no time lag is generated between the moment of touching the touch panel 51 and the moment of responding with the haptic vibration, thus preventing the user from feeling uncomfortable.

It should be noted that in the electronic apparatus 50 according to the embodiment, the contact detection section for detecting contact from the user is not limited to the touch panel, but a jog dial, a keyboard, a mouse, or the like can also be used therefor. Further, instead of combining the vibration pattern of the haptic vibration and the vibration pattern of the acoustic vibration by the CPU 55, previously combined patterns for output can be stored in the vibration data storage section 54. Further, in the electronic apparatus 50 applying the embodiment, the vibration generation section for generating the vibration is not limited to the piezoelectric actuator 53, but a voice coil motor, an eccentric vibration motor, or the like can also be applied therefor.

Figure 4:
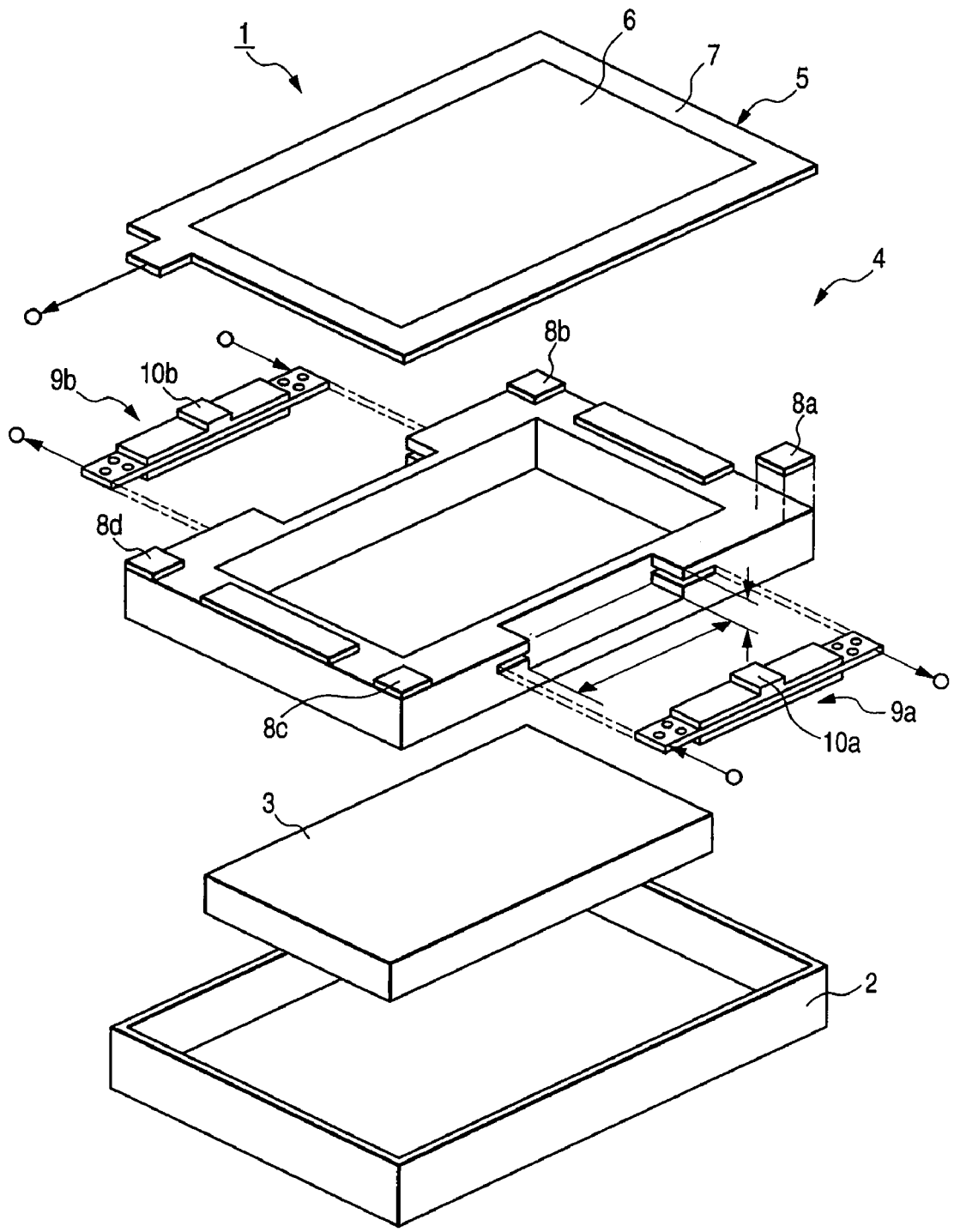
FIG. 4 is an exploded perspective view of an electronic apparatus according to an embodiment.

A specific example of an electronic apparatus according to an embodiment will hereinafter be described. FIG. 4 is an exploded perspective view of an electronic apparatus 1. The electronic apparatus 1 is mainly composed of a housing 2, a display section 3, a chassis 4 for surrounding the periphery of the display section 3, and a position detection section 5 covering the upper side of the housing 2.

The position detection section 5 is mainly composed of a touch panel 6 for detecting contact and an outer frame 7 surrounding the periphery of the touch panel 6. The touch panel 6 is disposed overlapping the display section 3. Since the touch panel 6 has translucency, the display image of the display section 3 can be seen from above the touch panel 6. The user can touch a desired position of the touch panel 6 while looking at the display image. The touch panel 6 detects the position touched by the user and outputs information of the detected position to the CPU.

The chassis 4 is a rectangular frame surrounding the periphery of the display section 3. The chassis 4 is bonded with the backside of the outer frame 7 of the position detection section 5. Force detection means 8a through 8d provided in the four corners of the chassis 4 detect the pressure applied to the position detection section 5.

Piezoelectric actuators 9a, 9b are built into the side faces of the chassis 4. Protrusions 10a, 10b of the piezoelectric actuators 9a, 9b are bonded with the backside of the outer frame 7 of the position detection section 5. The protrusions 10a, 10b vibrate the outer frame 7 of the position detection section 5.

Figure 5A:
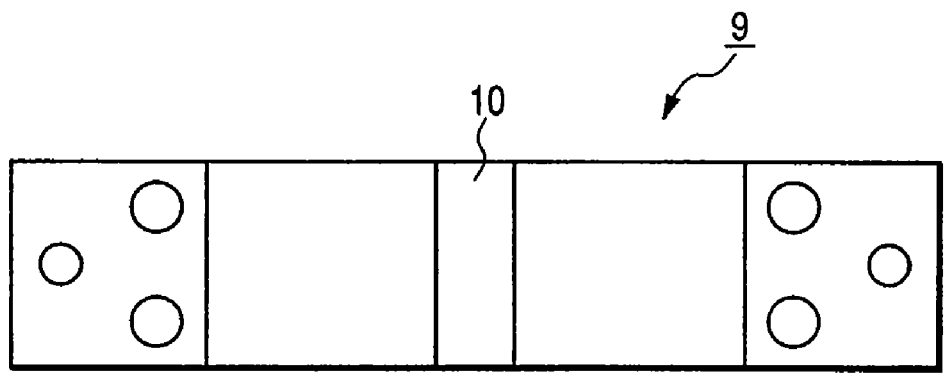
FIGS. 5A and 5B are a top view and a side cross-sectional view, respectively, showing a structure of an piezoelectric actuator.
Figure 5B:
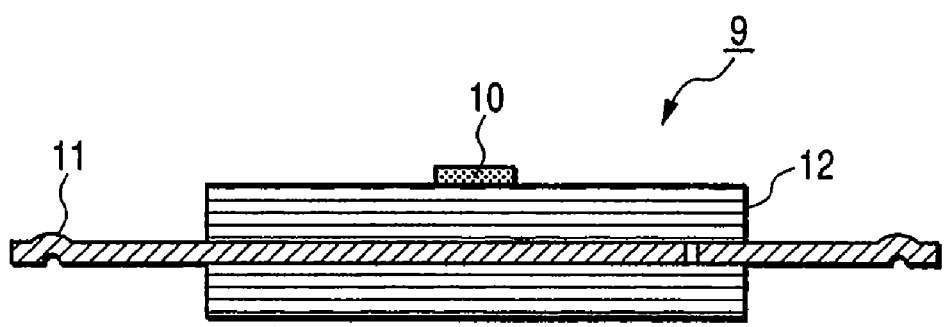
Figure 6:
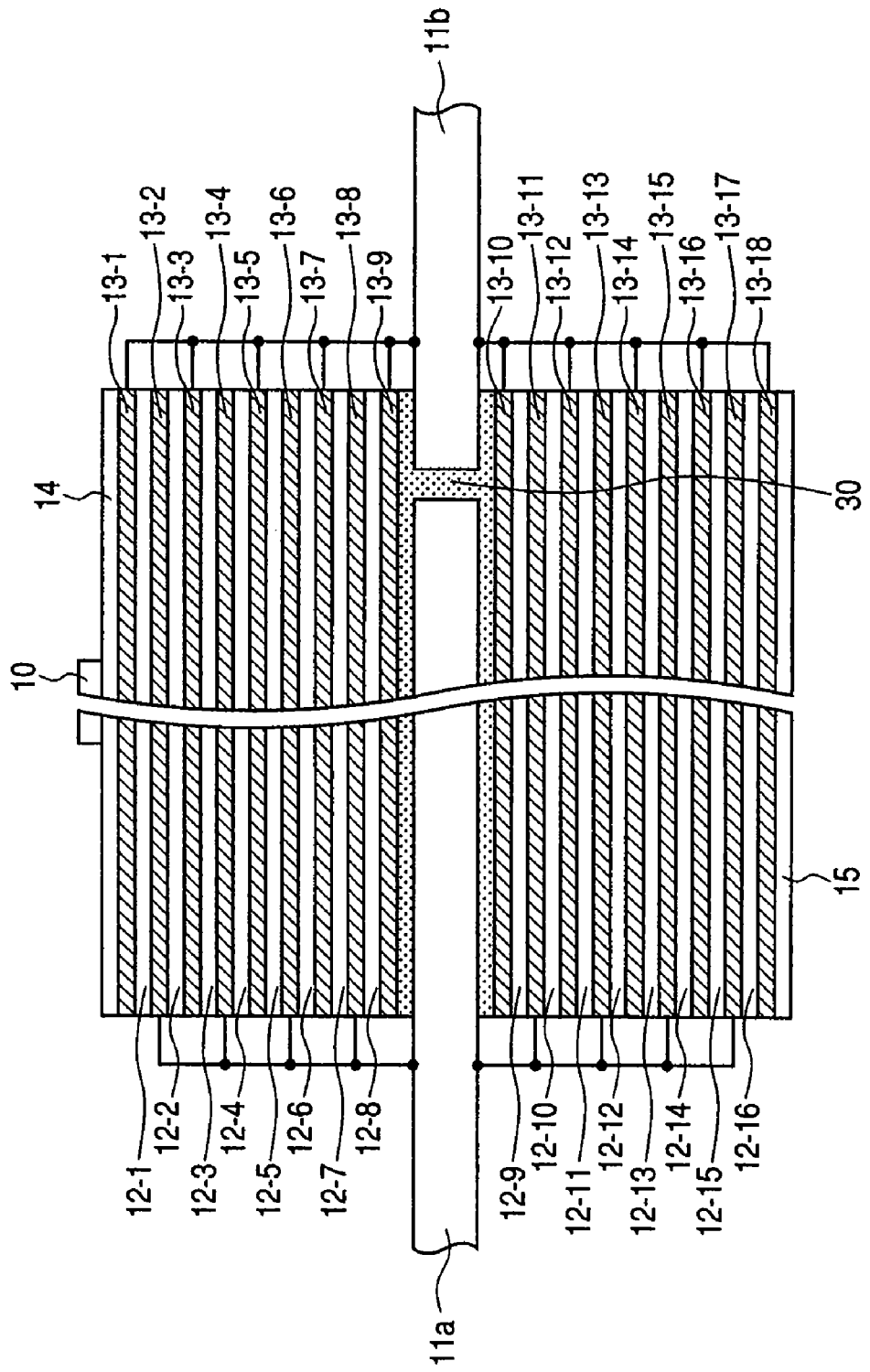
FIG. 6 is a side cross-sectional view enlargedly showing a substantial part of the piezoelectric actuator.

FIGS. 5A, 5B, and 6 show an example of the actuators 9a, 9b. FIG. 5A is a top view of the piezoelectric actuator 9, and FIG. 5B is a side cross-sectional view of the piezoelectric actuator 9. The piezoelectric actuator 9 is provided with a central electrode 11, piezoelectric elements 12 stacked on the both front and back sides of the central electrode 11, and the protrusion 10 as the contact point between the piezoelectric actuator 9 and the position detection section 5.

FIG. 6 is a side cross-sectional view enlargedly showing a substantial part of the piezoelectric actuator 9. The piezoelectric actuator 9 in the present embodiment is provided with sixteen layers of thinly stretched piezoelectric elements 12-1 through 12-16, eighteen layers of electrodes 13-1 through 13-18 stacked between the piezoelectric elements, and the central electrode 11 applying voltage to the electrodes 13-1 through 13-18.

The central electrode 11 is covered with an insulator 30 in the periphery thereof. In the upper side of the insulator 30 in the drawing, there are stacked eight layers of the piezoelectric elements 12-1 through 12-8 and nine layers of electrodes (hereinafter described as upper electrodes) 13-1 through 13-9 alternately with each other. On the electrode 13-1, the upper most layer in the drawing, there is provided an upper insulating layer 14. The upper insulating layer 14 is provided with the protrusion 10 at the center thereof. The vibration of the piezoelectric actuator 9 is transmitted to the position detection section 5 via the protrusion 10. Further, in the lower side of the insulator 30 in the drawing, there are stacked eight layers of piezoelectric elements 12-9 through 12-16, nine layers of electrodes (hereinafter described as lower electrodes) 13-10 through 13-18 alternately with each other, and further, a lower insulating layer 15 below the electrode 13-18, the lower most layer.

The central electrode 11 is divided by the insulator 30 into a first electrode section 11a for applying a first voltage and a second electrode section 11b for applying a second voltage. The first electrode section 11a is connected to the electrodes 13-2, 13-4, 13-6, 13-8, 13-11, 13-13, 13-15, and 13-17, while the second electrode section is connected to the electrodes 13-1, 13-3, 13-5, 13-7, 13-9, 13-10, 13-12, 13-14, 13-16, and 13-18. Each of the piezoelectric elements 12-1 through 12-16 is sandwiched by the electrode to which the first voltage is applied and the electrode to which the second voltage is applied. Each of the piezoelectric elements 12-1 through 12-16 expands or contracts in accordance with the potential difference caused by the two electrodes. The actuator drive section (described later) outputs an alternate current voltage. Thus, the piezoelectric elements 12 repeatedly expand and contract to cause vibration. This vibration is transmitted to the position detection section 5 via the protrusion 10 provided to the upper insulating layer 14.

The stacked piezoelectric actuator can be driven with a lower drive voltage of, for example, ±5V than that of the typical piezoelectric actuator. This drive voltage satisfies rating of an audio output system such as a video camera or a playback device. On the contrary, the typical piezoelectric actuator is driven with a rather high drive voltage, for example, ±10V. According to the input device applying the embodiment, a step-up circuit can be eliminated by adopting the stacked piezoelectric actuator.

FIG. 7 is a block diagram showing an internal configuration of the electronic apparatus 1. The electronic apparatus 1 is provided with the position detection section 5 for detecting a position touching the tip of the user's finger or the specialized pen, the force detection section 8 for detecting the input amount (force) when touching, an AD driver 16 for converting the position information and the input amount, both of which are analog signals, into digital signals, and for detecting whether an input to the position detection section 5 is a cursoring input or a selection input to output an input flag to a CPU 17, the CPU 17 for generating the output vibration pattern based on the position information, input amount, and the input flag input from the AD driver 16, a memory 18 served as a working area of the CPU 17, an actuator drive circuit 19 for converting the drive voltage of the piezoelectric actuator 9 in accordance with the output vibration pattern input from the CPU 17, an image processing section 20 for making the display section 3 display the image information input from the CPU 17, and the piezoelectric actuator 9 for generating the vibration.

The vibration data storage section 32 stores a plurality of vibration patterns. The vibration pattern is expressed by the frequency, the amplitude, and the number of the vibration. In the vibration patterns, the frequency of the haptic vibration is in a range of 50 through 500 Hz, and the frequency of the acoustic vibration is equal to or higher than 500 Hz.

This is because human beings are sensitive to the vibration with the frequency in the range of 50 through 500 Hz, peaked at around 200 Hz, and the sensitivity to the vibration can be enhanced by increasing the amplitude.

Further, since there is displacement between the frequency band of the acoustic vibration and the frequency band of the haptic vibration, human beings do not feel the acoustic vibration as a vibration, and adversely, do not hear the haptic vibration as a sound. The electronic apparatus 1 according to the embodiment utilizes the displacement in the frequency ranges between the acoustic vibration and the haptic vibration to make the piezoelectric actuator 9 generate both of the acoustic vibration and the haptic vibration. The electronic apparatus 1 of the present embodiment can eliminate the members necessary for outputting a sound such as a loudspeaker or a buzzer by outputting the acoustic vibration with the piezoelectric actuator 9.

The CPU 17 selects an appropriate vibration pattern from the vibration pattern storage section 32 to generate the vibration pattern for output. Table 1 shows the vibration patterns of the haptic vibration while Table 2 shows the vibration patterns of the acoustic vibration.

TABLE 1

|  | FREQUENCY | AMPLITUDE | NUMBER OF TIMES |
|---|---|---|---|
| CLICK | 200 Hz | ±5 V | 1 |
| STOP | 200 Hz | ±5 V | 1 |
|  | 50 Hz | ±2.5 V | 2 |
|  | 200 Hz | ±5 V | 1 |
| WAN | 200 Hz | ±5 V | 2 |
|  | 200 Hz | ±2.5 V | 4 |
|  | 200 Hz | ±0.5 V | 4 |

Table 1 described above exemplifies the haptic vibration CLICK of a single large vertical movement of the fingertip, the haptic vibration STOP of a double small vertical movement of the fingertip, and the haptic vibration WAN for gradually attenuating the vibration. The haptic vibration CLICK is a single vibration with the frequency of 200 Hz and the amplitude of ±5V. The haptic vibration STOP is composed of the vibration with the frequency of 200 Hz and the amplitude of ±5V once, the vibration with the frequency of 50 Hz and the amplitude of ±2.5V twice, and the vibration with the frequency of 200 Hz and the amplitude of 5V once. The haptic vibration WAN is composed of the vibration with the frequency of 200 Hz and the amplitude of ±5V twice, the vibration with the frequency of 200 Hz and the amplitude of ±2.5V four times, and the vibration with the frequency of 200 Hz and the amplitude of ±0.5V four times.

TABLE 2

|  | FREQUENCY | AMPLITUDE | NUMBER OF TIMES |
|---|---|---|---|
| ENABLE | 1 kHz | ±0.5 V | 32 |
|  | NULL |  | 32 ms |
|  | 1 kHz | ±0.5 V | 18 |
| DISABLE | 625 Hz | ±0.5 V | 43 |
|  | NULL |  | 16 ms |
|  | 625 Hz | ±0.5 V | 31 |
|  | NULL |  | 16 ms |
|  | 625 Hz | ±0.5 V | 34 |
| CAUTION | 770 Hz | ±0.5 V | 30 |
|  | NULL |  | 30 ms |
|  | 584 Hz | ±0.5 V | 58 |
|  | NULL |  | 100 ms |
|  | 770 Hz | ±0.5 V | 30 |
|  | NULL |  | 30 ms |
|  | 584 Hz | ±0.5 V | 58 |
|  | NULL |  | 100 ms |
|  | 770 Hz | ±0.5 V | 30 |
|  | NULL |  | 30 ms |
|  | 584 Hz | ±0.5 V | 58 |
|  | NULL |  | 100 ms |

Table 2 described above exemplifies the acoustic vibration ENABLE when "consenting to" the input, the acoustic vibration DISABLE when "rejecting" the input, and the acoustic vibration CAUTION for "cautioning" about the input. In the acoustic vibration ENABLE, the vibration with the frequency of 1 kHz and the amplitude of ±0.5V is output 32 times followed by the 32 ms pause, and the vibration with the frequency of 1 kHz and the amplitude of ±0.5V is output 18 times. In the acoustic vibration DISABLE, the vibration with the frequency of 625 Hz and the amplitude of ±0.5V is output 43 times followed by the 16 ms pause, the vibration with the frequency of 625 Hz and the amplitude of ±0.5V is output 31 times followed by the 16 ms pause, and the vibration with the frequency of 625 Hz and the amplitude of ±0.5V is output 34 times. In the acoustic vibration CAUTION, the vibration with the frequency of 770 Hz and the amplitude of ±0.5V is output 30 times followed by the 30 ms pause, the vibration with the frequency of 584 Hz and the amplitude of ±0.5V is output 58 times followed by the 100 ms pause, the vibration with the frequency of 770 Hz and the amplitude of ±0.5V is output 30 times followed by the 30 ms pause, the vibration with the frequency of 584 Hz and the amplitude of ±0.5V is output 58 times followed by the 100 ms pause, the vibration with the frequency of 770 Hz and the amplitude of ±0.5V is output 30 times followed by the 30 ms pause, and the vibration with the frequency of 584 Hz and the amplitude of ±0.5V is output 58 times followed by the 100 ms pause.

Figure 8A:
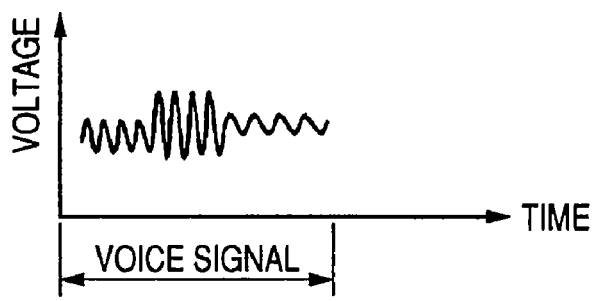
FIGS. 8A through 8E are graph charts showing waveforms of an actuator drive voltage.
Figure 8B:
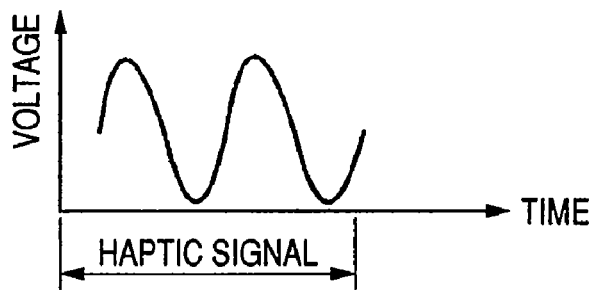

The actuator drive circuit 19 inputs the output vibration pattern from the CPU 17, and modifies the voltage applied to the piezoelectric actuator 9 in accordance with the output vibration pattern input therefrom. FIGS. 8A through 8E show waveforms of the actuator drive voltage. FIGS. 8A, 8B, 8C, and 8D show four variations of the voltage. FIG. 8A is the voltage waveform of the actuator drive voltage when the acoustic vibration is output. FIG. 8B is the voltage waveform of the actuator drive voltage when the haptic vibration is output.

Figure 8C:
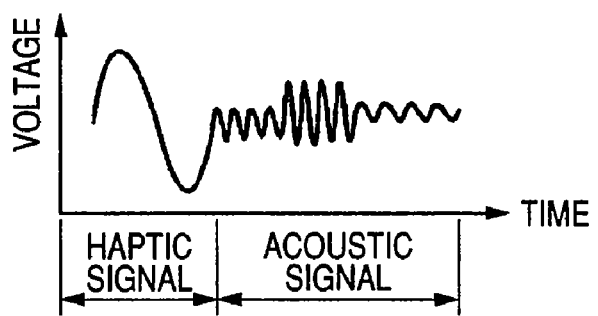
Figure 8D:
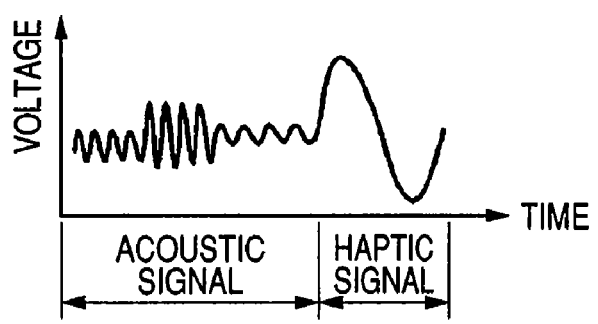

FIGS. 8C and 8D are the voltage waveforms of the actuator drive voltage when the acoustic vibration and the haptic vibration are continuously output.

When the actuator drive voltage of FIG. 8C is applied, the piezoelectric actuator 9 outputs the haptic vibration first, and then subsequently outputs the acoustic vibration after the output of the haptic vibration has completed. When the actuator drive voltage of FIG. 8D is applied, the piezoelectric actuator outputs the acoustic vibration first, and then subsequently outputs the haptic vibration after the output of the acoustic vibration has completed.

In comparison of the methods according to FIGS. 8C and 8D, the method of FIG. 8C is considered to be better. This is because when the haptic vibration is generated earlier as in the case of FIG. 8C, no time lag is generated between the moment of touching the touch panel 6 and the moment of responding with the haptic vibration, thus preventing the user from feeling uncomfortable.

Figure 8E:
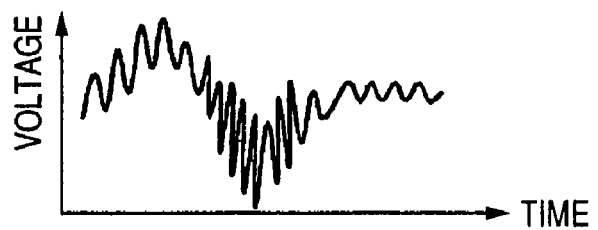

Further, as shown in FIG. 8E, it is possible to overlap the drive voltage of the haptic vibration and the drive voltage of the acoustic vibration. However, if the actuator drive voltage of FIG. 8E is applied to the piezoelectric actuator 9, one vibration causes a noise component for the other vibration. The electronic apparatus 1 applying the embodiment of the invention generates the acoustic vibration and the haptic vibration with a time deviation to prevent the noise caused by combining the vibration patterns.

Figures 9A, 9B, 9C:
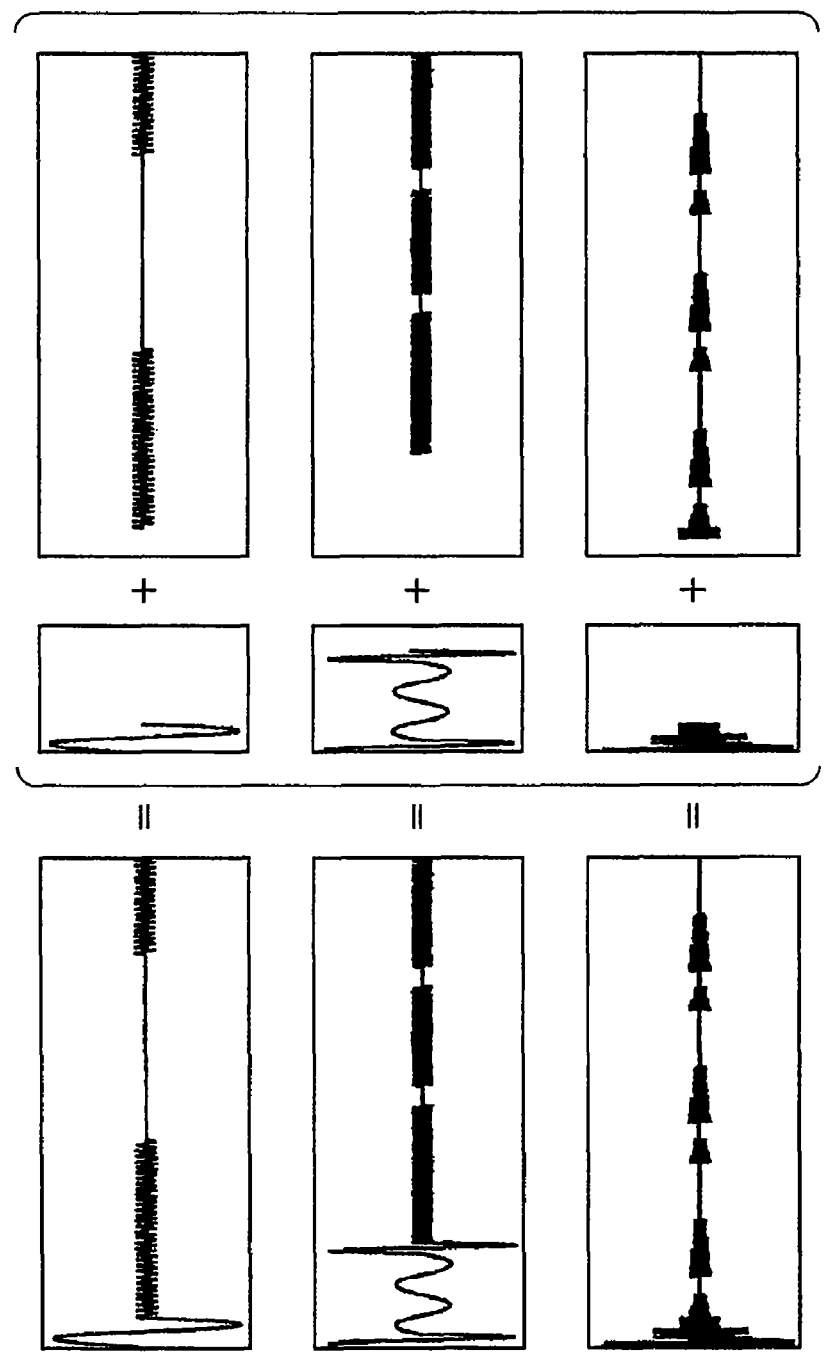
FIGS. 9A through 9C are graph charts showing waveforms of the actuator drive voltage when combining a vibration pattern of a haptic vibration with a vibration pattern of an acoustic vibration.

FIGS. 9A through 9C are voltage waveforms when combining the vibration pattern of the haptic vibration and the vibration pattern of the acoustic vibration shown in Tables 1 and 2. The voltage waveform shown in FIG. 9A is a combination of the haptic vibration of CLICK and the acoustic vibration of ENABLE. Thus, the piezoelectric actuator 9 largely vibrates once and then outputs a high-pitched beep sound twice.

The voltage waveform shown in FIG. 9B is a combination of the haptic signal of STOP and the acoustic signal of DISABLE. Thus, the piezoelectric actuator 9 vibrates twice, and then outputs a low beep sound three times.

The voltage waveform shown in FIG. 9C is a combination of the haptic signal of WAN and the acoustic signal of CAUTION. Thus, the piezoelectric actuator 9 vibrates ten times while gradually attenuating the vibration, and then repeatedly outputs a high beep sound and a low beep sound three times after attenuating the vibration.

Although in the previous description, the electronic apparatus 1 outputs both of the haptic and the acoustic vibrations, it is also possible to set a silent mode for switching the output to the haptic only output or to the sound only output.

FIG. 10 is a flowchart for explaining the process of the silent mode in which only the haptic vibration is output. The electronic apparatus 1 waits for an operation by the user while the user does not operate the touch panel 6 (step S11: NO). When the user operates the touch panel 6 (step S11: YES), the CPU 17 detects whether or not the silent mode is set.

If the silent mode is set (step S12: YES), the CPU 17 selects only the vibration pattern of the haptic vibration, and outputs it to the actuator drive circuit 19. The actuator drive circuit 19 then generates only the haptic vibration (step S13) in accordance with the vibration pattern input from the CPU 17.

On the other hand, if the silent mode is not set in step S12 (step S12: NO), the CPU 17 detects whether or not the electronic apparatus 1 is recording any sounds. If the electronic apparatus 1 is performing recording (step S14: YES), the CPU 17 moves the process to the step S13 to generate only the haptic vibration. On the other hand, if the electronic apparatus 1 is not recording any sounds (step S14: NO), the CPU combines the vibration pattern of the haptic vibration and the vibration pattern of the acoustic vibration and outputs the result to the actuator drive circuit 19. The actuator drive circuit 19 then generates both the haptic vibration and the acoustic vibration (step S15) in accordance with the vibration pattern input from the CPU 17.

Figure 11A:
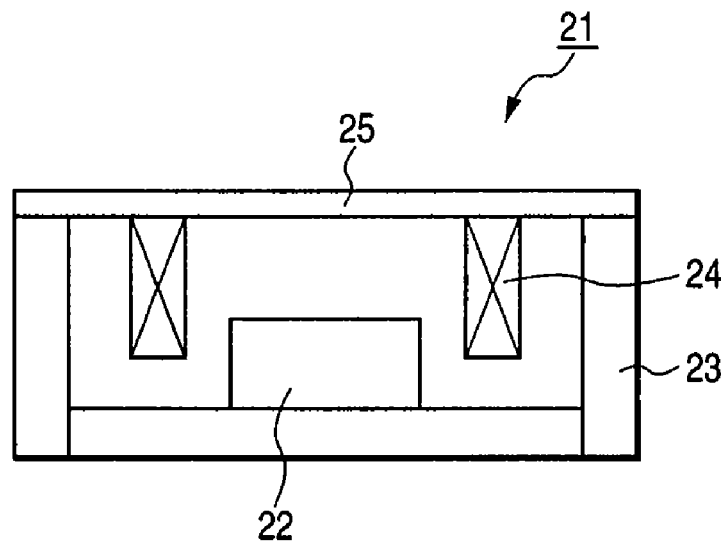
FIGS. 11A and 11B are schematic views showing a configuration of a voice coil type speaker device.
Figure 11B:
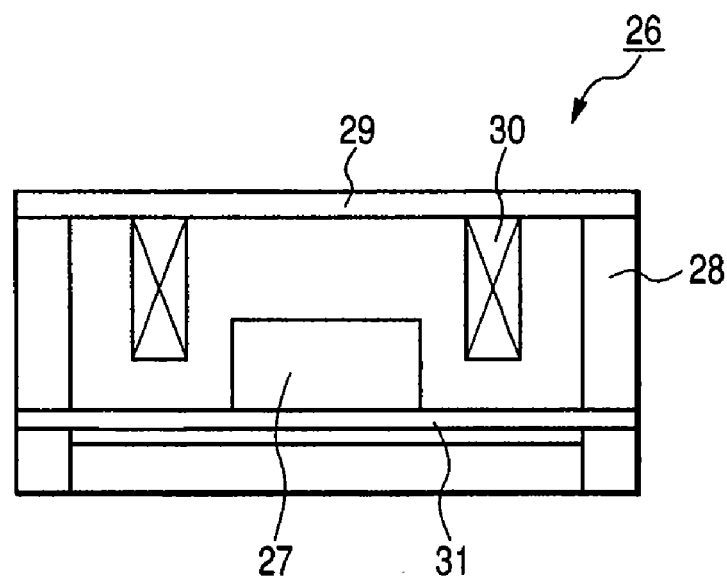
Figure 12:
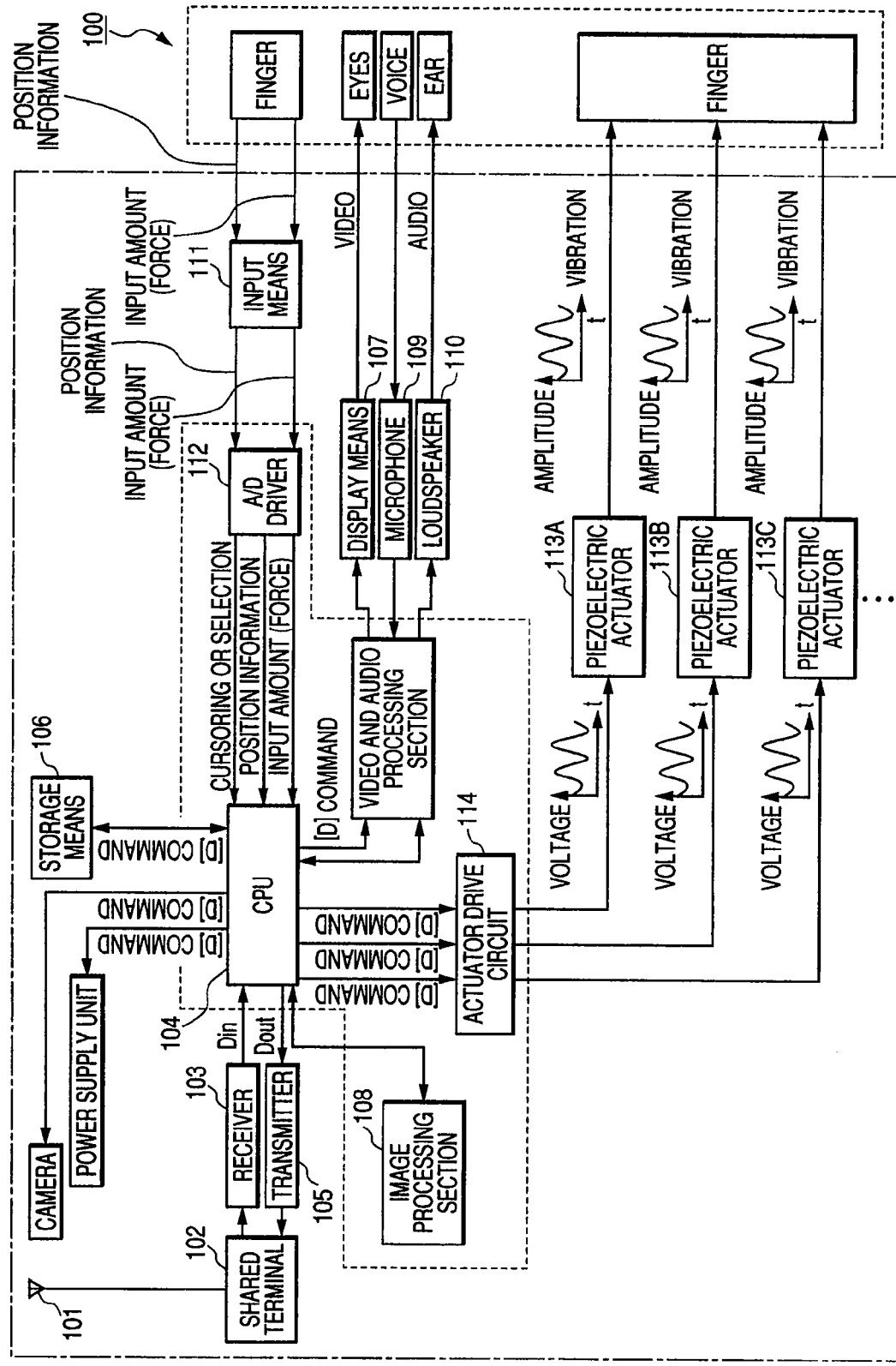
FIG. 12 is a block diagram showing an internal structure of a cellular phone provided with a haptic reproduction function.

A voice coil type speaker device 25 to be used instead of the piezoelectric actuator 9 will hereinafter be described. FIG. 11A is a side cross-sectional view of a voice coil type speaker device 21 in the background art, and FIG. 11B is a cross-sectional view of a voice coil type speaker device 26 applying the embodiment.

In the voice coil type speaker device 21 in the background art, the magnetic flux generated by the magnet 22 is conducted into the yoke 23 to cause a strong magnetic field for the voice coil 24. The voice coil 24 moves in the vertical direction of the drawing in accordance with the Lorentz force caused by the magnetic field. The movement is transmitted to the cone 25 to vibrate the air around the cone, thereby outputting a sound.

In the voice coil type speaker device 26 applying the embodiment, the magnetic flux caused by the magnet 27 is conducted to the yoke 28 to create the strong magnetic field for the voice coil 30 similarly to the case with the voice coil type speaker device 21 in the background art. The voice coil 30 then moves in the vertical direction of the drawing in accordance with the Lorentz force caused by the magnetic field.

The voice coil type speaker device 26 is provided with an additional cone (hereinafter described as a second cone) 31. A magnet 27 is provided on the second cone 31. When driving the voice coil type speaker device, the voice coil 30 and the magnet 27 are moved in the vertical direction in the drawing. In this case, the magnet 27 becomes a weight and functioned as the vibration motor. Since the voice coil type speaker device 26 has substantially the same configuration as the voice coil type speaker device 21 in the background art, it can output a high quality sound.

It should be noted that in the electronic apparatus 1 applying the embodiment, a piezoelectric speaker or a vibration type speaker besides the voice coil type speaker device 26 can also be adopted thereto instead of the piezoelectric actuator 9. Further, the embodiment can be applied not only to the touch panel but also to input devices operated by the user in touch therewith such as a keyboard or a jog dial.

It should be understood by those skilled in the art that various modifications, combinations, sub-combinations and The invention is claimed as follows:

1. An electronic apparatus, comprising:
   A display section
   a contact detection section for detecting contact from a user; the contact detection section including a touch panel,
   a vibration output section for outputting an acoustic vibration that can be sensed by the user as a sound and a haptic vibration for stimulating the haptic sense of the user,
   wherein the vibration output section includes a stacked piezoelectric actuator having a central electrode covered with an insulator, wherein the central electrode is in-between a plurality of piezoelectric elements;
   a pattern generation section for generating an output vibration pattern including the acoustic vibration and the haptic vibration in response to the contact detection section detecting the contact from the user; and
   a drive section for driving the vibration output section in accordance with the output vibration pattern to make the vibration output section output the acoustic vibration and the haptic vibration, wherein the drive section includes an acoustic drive section and a haptic drive section integrated into a single circuit.

2. The electronic apparatus according to claim 1, wherein the pattern generation section generates the output vibration pattern by combining vibration patterns of the acoustic vibration and the haptic vibration in a time-sharing manner.

3. The electronic apparatus according to claim 1, wherein the pattern generation section generates the output vibration pattern so that the haptic vibration is output earlier than the acoustic vibration.

4. The electronic apparatus according to claim 1, further comprising:
   a pattern storage section for storing the vibration patterns;
   wherein the pattern generation section selects an appropriate vibration pattern out of the vibration patterns stored in the pattern storage section, and generates the output vibration pattern based on the selected vibration pattern.

5. The electronic apparatus according to claim 1, wherein the drive section outputs a voltage amplitude in a range of ±0.5 volts to ±5 volts to the stacked piezoelectric actuator.

6. The electronic apparatus according to claim 1, wherein the drive section drives the stacked piezoelectric actuator without a step-up circuit.

7. The electronic apparatus according to claim 1, wherein the central electrode is divided by the insulator into a first electrode section for applying a first voltage and a second electrode section for applying a second voltage.

8. The electronic apparatus according to claim 7, wherein the stacked piezoelectric actuator further comprises:
   the plurality of piezoelectric elements stacked on front and back sides of the central electrode; and
   a plurality of electrodes stacked between the piezoelectric elements,
   wherein the plurality of electrodes include a first type of electrode connected to the first electrode section of the central electrode, and a second type of electrode connected to the second electrode section of the central electrode.

9. An electronic apparatus, comprising:
   A display section,
   a contact detection section for detecting contact from a user; the contact detection section including a touch panel,
   a vibration output section for outputting an acoustic vibration that can be sensed by the user as a sound and a haptic vibration for stimulating the haptic sense of the user,
   wherein the vibration output section includes a stacked piezoelectric actuator having a central electrode covered with an insulator, wherein the central electrode is in-between a plurality of piezoelectric elements, a pattern generation section for generating an output vibration pattern including the acoustic vibration and the haptic vibration in response to the contact detection section detecting the contact from the user; and
   a drive section for driving the vibration output section in accordance with the output vibration pattern, wherein the drive section includes an acoustic drive section and a haptic drive section integrated into a single circuit, and wherein the drive section drives the stacked piezoelectric actuator without a step-up circuit to make the stacked piezoelectric actuator output the acoustic vibration and the haptic vibration.

* * * * *